United States Patent
Torkelson et al.

(10) Patent No.: US 9,624,320 B2
(45) Date of Patent: Apr. 18, 2017

(54) MALEIC ANHYDRIDE FUNCTIONALIZATION OF POLYPROPYLENE VIA SOLID-STATE SHEAR PULVERIZATION

(71) Applicant: Northwestern University, Evanston, IL (US)

(72) Inventors: John M. Torkelson, Skokie, IL (US); Jeanette M. Diop, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 14/428,605

(22) PCT Filed: Sep. 23, 2013

(86) PCT No.: PCT/US2013/061246
§ 371 (c)(1),
(2) Date: Mar. 16, 2015

(87) PCT Pub. No.: WO2014/047591
PCT Pub. Date: Mar. 27, 2014

(65) Prior Publication Data
US 2015/0232587 A1    Aug. 20, 2015

Related U.S. Application Data

(60) Provisional application No. 61/704,096, filed on Sep. 21, 2012.

(51) Int. Cl.
*C08F 10/06* (2006.01)
(52) U.S. Cl.
CPC .................................. *C08F 10/06* (2013.01)
(58) Field of Classification Search
None
See application file for complete search history.

(56) References Cited

U.S. PATENT DOCUMENTS

| | | | |
|---|---|---|---|
| 5,814,673 A | 9/1998 | Khait | |
| 6,180,685 B1 | 1/2001 | Khait | |
| 7,223,359 B2 | 5/2007 | Torkelson et al. | |
| 8,597,557 B1 * | 12/2013 | Torkelson | C08K 3/06 264/176.1 |
| 2005/0171295 A1 * | 8/2005 | Kanamaru | C09J 123/10 525/386 |
| 2011/0003095 A1 * | 1/2011 | Becker | C09J 151/06 428/17 |
| 2011/0263776 A1 * | 10/2011 | Debras | B82Y 30/00 524/445 |

OTHER PUBLICATIONS

Rengarajan, J. Appl. Polym. Sci., vol. 39, p. 1783-1791 (1990).*
Qui, European Polymer Journal, 41, (2005) p. 1979-1984.*
Furgiuele, N. et al., "Efficient Mixing of Polymer Blends of Extreme Viscosity Ratio: Elimination of Phase Inversion via Solid-State Shear Pulverization", Polym. Eng. Sci. 2000, 40(6), 1447-1457.
Walker, A. et al., "Polyethylene/starch Blends with Enhanced Oxygen Barrier and Mechanical Properties: Effect of Granule Morphology Damage by Solid-State Shear Pulverization", Polymer 2007, 48, 1066-1074.
Lebovitz, A. et al., "Stabilization of Dispersed Phase to Static Coarsening: Polymer Blend Compatibilization via Solid-State Shear Pulverization", Macromolecules 2002, 35, 8672-8675.
Lebovitz, A. et al., "Sub-micron Dispersed-phase Particle Size in Polymer Blends: Overcoming the Taylor Limit via Solid-State Shear Pulverization", Polymer 2003, 44, 199-206.
Tao, Y. et al., "Achievement of Quasi-nanostructured Polymer Blends by Solid-State Shear Pulverization and Compatibilization by Gradient Copolymer Addition", Polymer 2006, 47, 6773-6781.
Furgiuele, N. et al., "Novel Strategy for Polymer Blend Compatibilization: Solid-State Shear Pulverization", Macromolecules 2000, 33(2), 225-228.

* cited by examiner

*Primary Examiner* — Robert C Boyle
(74) *Attorney, Agent, or Firm* — Reinhart Boerner Van Deuren s.c.

(57) ABSTRACT

Functionalization of polymers, including polyolefins, with a, β-unsaturated carboxy-derived moieties through the use of solid-state shear pulverization.

30 Claims, 12 Drawing Sheets

[1]

[2]

[3]

Figure 1:
Figure 1:
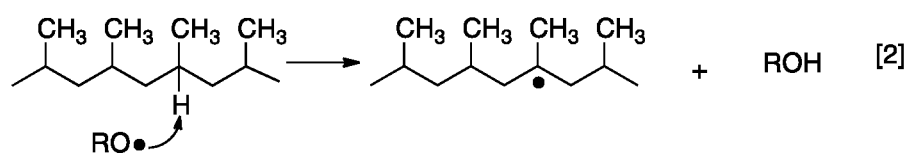
Figure 1:
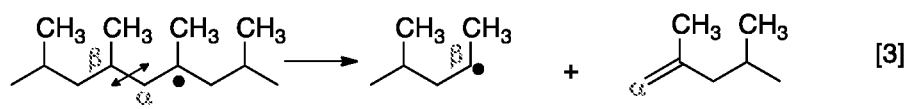

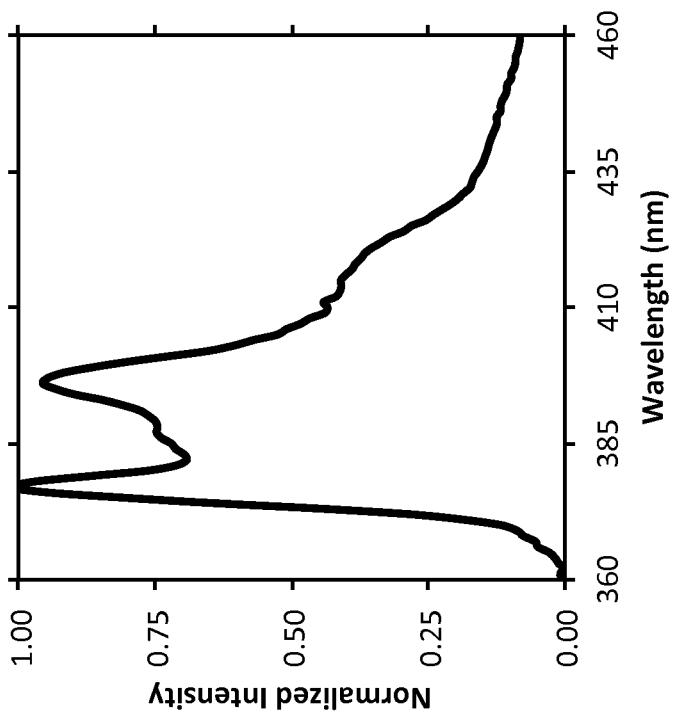
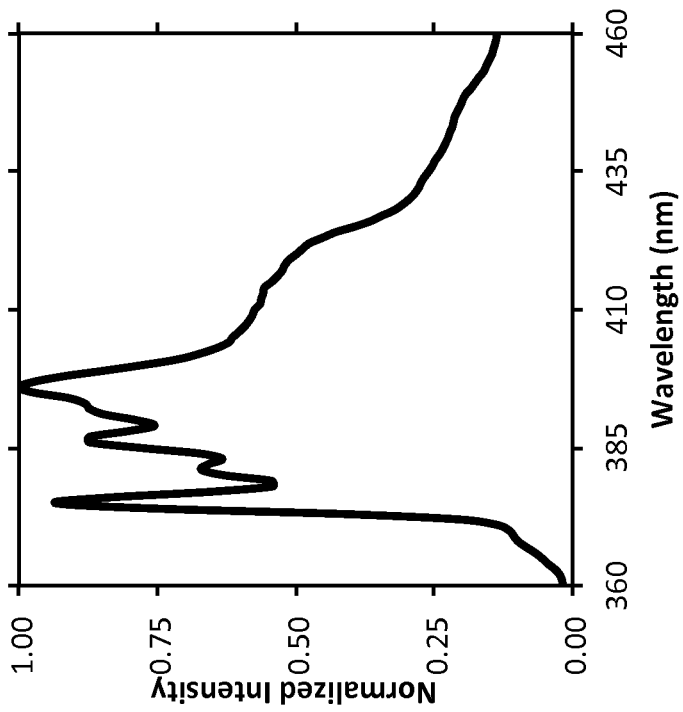

US 9,624,320 B2

MALEIC ANHYDRIDE FUNCTIONALIZATION OF POLYPROPYLENE VIA SOLID-STATE SHEAR PULVERIZATION

This application claims priority to and the benefit of International Application no. PCT/US2013/061246 filed Sep. 23, 2013, and prior provisional patent application No. 61/704,096 filed Sep. 21, 2012—each of which is incorporated herein by reference in its entirety.

BACKGROUND OF THE INVENTION

Blends of polypropylene (PP) and more polar polymers (e.g., nylon) are typically prepared using a compatibilizer such as a maleic anhydride (MA)-grafted PP. Conventionally, functionalization of PP with MA is achieved via melt processing. However, such melt processing techniques are accompanied by drastic reduction in PP molecular weight. Such molecular weight reduction results in detrimental material property change, by comparison to that of the neat PP from which the functionalized PP was made. The molecular weight reduction of PP associated with melt processing is caused by a free-radical chemistry (i.e., β-scission) that is highly dependent on temperature. (See, FIG. 1.) As processing temperature increases, the rate of β-scission increases dramatically. (See, Rätzsch, M.; Arnold, M.; Borsig, E.; Bucka, H.; Reichelt, N. *Progress in Polymer Science* 2002, 27, 1195-1282 and Dickens, B. *Journal of Polymer Science: Polymer Chemistry Edition* 1982, 20, 1169-1183.) Because melt processing is carried out at high temperatures (i.e., ~190-220° C.), the extent of β-scission is typically significant. As a result, there remains an on-going concern in the art to develop an efficient and effective process for the preparation of MA-grafted PP as well as other functionalized polyolefins. This need, as well as its expected impact on the properties of the resulting polymeric materials, has been recognized and illustrated clearly in literature: The incorporation of functional groups along the backbone of polyolefins such as polyethylene and polypropylene in a selective, controlled, and mild manner is considered to be one of the most important challenges currently facing synthetic polymer chemists. (See, Boaen, N. K.; Hillmyer, M. A. *Chemical Society Reviews* 2005, 34, 267-75).

SUMMARY OF THE INVENTION

In light of the foregoing, it is an object of the present invention to provide a methodology for polyolefin functionalization, thereby overcoming various deficiencies and shortcomings of the prior art, including those outlined above. It will be understood by those skilled in the art that one or more aspects of the invention can meet certain objectives, while one or more aspects can meet certain other objectives. Each objective may not apply equally, in all its respects, to every aspect of this invention. As such, the following objects can be viewed in the alternative with respect to any one aspect of this invention.

It can be an object of the present invention to provide one or more methods to graft maleic anhydride moieties onto a polymer backbone.

It can be an object of the present invention to provide one or more methods to graft functional moieties onto a polymer backbone. Examples of such functional moieties include others than those available through use of maleic anhydride (e.g., methacrylate esters, acrylate esters, maleate esters and itaconic acid esters, as well as other α,β-unsaturated carboxylic acid derivatives), such as but not limited to macromonomers (i.e., polymeric or oligomeric species with susceptible double bonds, e.g., methacrylate ester or maleimide derivatives), and macroradicals (i.e., polymeric or oligomeric species with radicals that could either be formed or activated during processing).

It can be another object of the present invention to provide one or more methods for incorporation of functional moieties into a polymeric resin to impart one or more functional effects thereto.

It can be yet another object of the present invention to provide one or more methods of functionalizing a polymeric resin using azobisisobutyronitrile (AIBN), a radical initiator that results in the formation of radicals that do not undergo significant chain transfer with the polymeric resin.

It can also be an object of the present invention to provide one or more methods of functionalizing a polymeric resin using other radical initiators that have half-lives comparable to that of AIBN (e.g., azobismethylbutyronitrile) or decompose to larger extents at lower temperatures (as compared to AIBN) and result in the formation of radicals that do not undergo significant chain transfer with the polymeric resin.

It can be another object of the present invention, alone or in conjunction with one or more of the preceding objectives, to provide one or more methods of functionalizing a polymeric resin with functional moieties (e.g., monomers, macromonomers, or macroradicals) using radical initiators that have half-lives comparable to that of AIBN or decompose to greater extents at low temperatures (as compared to AIBN) and result in the formation of radicals that do not undergo significant chain transfer with the polymeric resin.

It can also be an object of the present invention, alone or in conjunction with one or more of the preceding objectives, to provide a method for suppressing molecular weight reduction associated with maleic anhydride functionalized polypropylene, such suppression as compared to maleic anhydride functionalized polypropylene prepared without use of the present invention.

Other objects, features, benefits and advantages of the present invention will be apparent from this summary and the following descriptions of certain embodiments, and will be readily apparent to those skilled in the art having knowledge of various polymer functionalization techniques. Such objects, features, benefits, and advantages will be apparent from the above as taken in conjunction with the accompanying examples, data and all reasonable inferences to be drawn therefrom.

In part, the present invention can be directed to a method of preparing a functionalized polymer. Such a method can comprise providing a mixture comprising a polymer component, a functionalization component comprising an α,β-unsaturated carboxy-derived moiety and a free-radical initiator; and applying a mechanical energy to such a mixture through solid-state shear pulverization in the presence of cooling at least partially sufficient to maintain such a polymer in a solid state during pulverization. Such pulverization can be at least partially sufficient to graft and/or incorporate a carboxy-derived moiety on to such a polymer component and provide a functionalized polymer.

Without limitation, such a polymer component can be selected from polyolefins, polyesters, polyamides, epoxides, elastomers, copolymers thereof and combinations of such polymers and copolymers, together with various other polymer components as would be understood by those skilled in the art made aware of this invention. In certain embodiments, such a polymer component can be selected from polyolefins, co-polymers of such polyolefins and combinations thereof. In certain such embodiments, such a polymer component can be selected from polyethylene, polypropylene and co-polymers thereof.

Without limitation, such a functionalization component can be selected from maleic anhydride, silanes, itaconates, acrylate esters, methacrylate esters, maleate esters, maleimides, and various other α,β-unsaturated carboxylic acid derivatives as would be understood by those skilled in the art made aware of this invention. Such a functionalization component can comprise of about 0.01 wt % to about 40 wt % of such a mixture. Regardless, maleic anhydride can be utilized as a functionalization component for incorporation of a corresponding anhydride or related moiety into such a polymer component. Without limitation, a maleic anhydride moiety, monomer and/or oligomer thereof can be incorporated into isotactic or atactic polypropylene.

Without limitation, such a mixture can comprise a free-radical initiator of the sort known to those skilled in the art made aware of this invention. In certain embodiments, such an initiator can be selected from those components providing a nitrile radical decomposition product. In certain such embodiments, a useful initiator is azobisisobutyronitrile. Regardless, such an initiator can comprise about 0.1 wt % to about 40 wt % of such a mixture.

Without limitation, or regard to polymer identity, such a mixture can comprise a filler component selected from cellulous, rice husk ash, talc, silica, modified clay, unmodified clay, modified graphite, unmodified graphite, graphene, single-walled carbon nanotubes, multi-walled carbon nanotubes and combinations thereof, together with various other filler components as would be understood by those skilled in the art, such baked component as can be used to achieve desired functional effect or material property. Such a filler component can comprise about 0.1 wt % to about 50 wt % of such a mixture, or as can otherwise be utilized to achieve such effect or property.

Regardless, the present invention can be utilized to achieve a grafting percentage of about 0.01% up to about 100%. Such a functionalized polymer can be further processed through melt-mixing and, optionally, injection molded. Regardless, such a functionalized polymer can be incorporated into an article of manufacture.

In part, the present invention can be directed toward a method of functionalizing polypropylene (or other polymeric resins) with maleic anhydride (or other α, β-unsaturated carboxy-derived functional moieties). Such a method can comprise providing a mixture comprising a polymer comprising a polypropylene component, a functionalization component and a free-radical initiator; and applying a mechanical energy to such a mixture through solid-state shear pulverization in the presence of an element of cooling at least partially sufficient to maintain such a mixture in a solid state, such pulverization as can be at least partially sufficient to graft such a maleic anhydride moiety (or another carboxy-derived moiety) onto such a polypropylene component.

In certain non-limiting embodiments, such a polymer can be a polypropylene. Regardless of polymer identity, such a functionalization component can be maleic anhydride. Optionally, such a free-radical initiator can be azobisisobutyronitrile. A resulting functionalized polymer can comprise up to about 0.70 wt. % or more of grafted maleic anhydride. Such a functionalized polymer can be blended with a polymer more polar than polypropylene. In certain such embodiments, such a functionalized polymer can be blended with nylon.

In part, the present invention can also be directed to a method of using solid-state shear pulverization to prepare a functionalized polymer. Such a method can comprise providing a mixture comprising a polymer comprising a polypropylene component, a functionalization component comprising an α,β-unsaturated carboxy-derived moiety and a free-radical initiator component; introducing such a mixture to a solid-state shear pulverization apparatus comprising a cooling component; and applying a mechanical energy to such a mixture to solid-state shear pulverization in the presence of cooling at least partially sufficient to maintain such a polymer in a solid-state during pulverization, such pulverization as can be at least partially sufficient to graft such a carboxy-derived moiety onto such a polypropylene component, such pulverization as can provide a functionalized polymer. Without limitation, such mixture components can be as described elsewhere herein. In certain embodiments, such a polymer can be a polypropylene, such a functionalization component can be maleic anhydride, and such a free-radical initiator can be azobisisobutyronitrile.

In part, the present invention can also be directed toward a method of using solid-state shear pulverization to suppress molecular weight reduction during the functionalization of polypropylene (or other polymeric resins) with maleic anhydride (or other functional moieties). Such a method can comprise providing a mixture comprising polypropylene, maleic anhydride and free-radical initiator components; introducing such a mixture into a solid-state shear pulverization apparatus, such an apparatus as can comprise a cooling component at least partially sufficient to maintain the mixture in its solid state; and shear-pulverizing such a mixture as described herein, such pulverization as can result in the suppression of molecular weight reduction as compared to that observed for the product of a melt-processed maleic anhydride grafted polypropylene.

In part, the present invention can also be directed compositionally to a polymer. Such a polymer can comprise polypropylene with one or a plurality of propylene monomeric units comprising a pendent maleic anhydride moiety, such monomeric units as can be randomly distributed within such a polymer, and such a polymer the solid-state shear pulverization product of polypropylene and maleic anhydride. In certain embodiments, such a polymer product can comprise up to about 0.15 wt. % of such an anhydride moiety. In certain other embodiments, such a moiety can be up to about 0.70 wt. % or more of such a polymer product. These anhydride contents can be at least partially sufficient to provide one or more functional effects, including but not limited to compatibilization of a blend of polypropylene with a more polar polymeric component (e.g., without limitation, nylon).

DETAILED DESCRIPTION OF THE DRAWINGS

FIG. 1: A schematic illustration of a mechanism associated with β-scission and molecular weight reduction of polypropylene (Prior Art).

Figure 2:
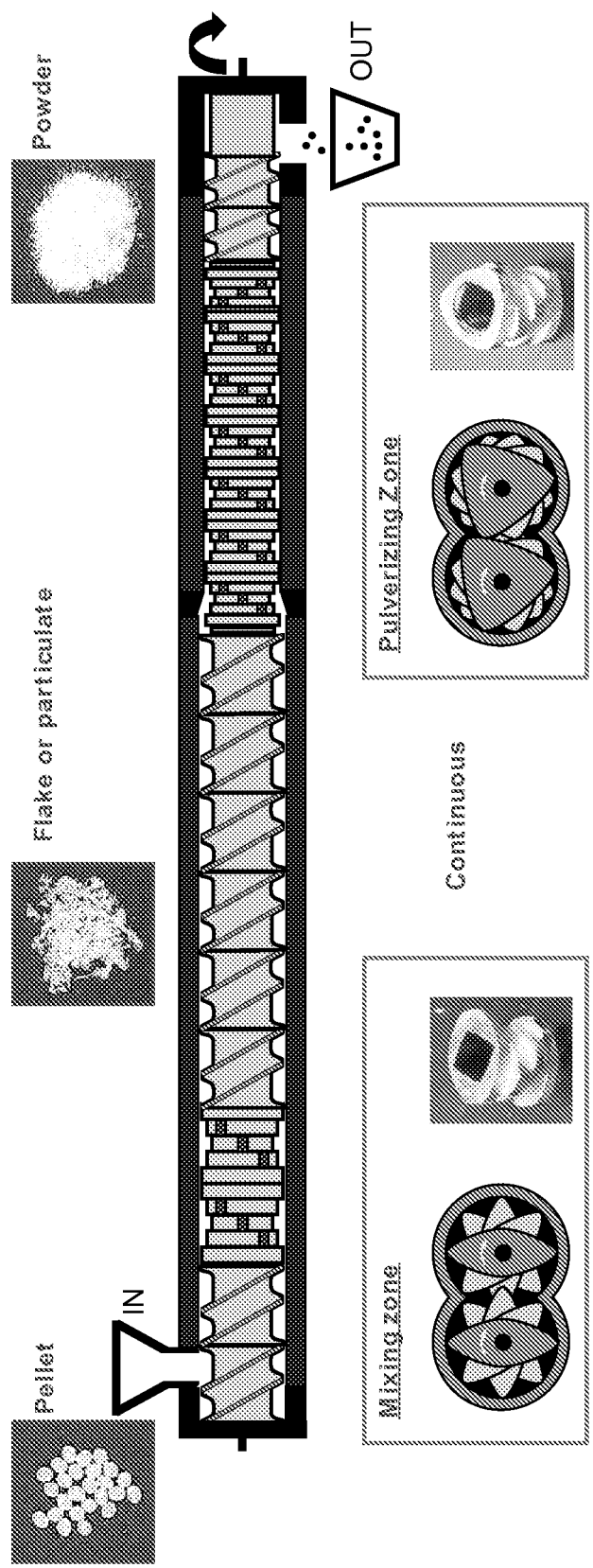

FIG. 2: SSSP Apparatus of the sort useful in conjunction with certain embodiments of this invention.

Figure 3:
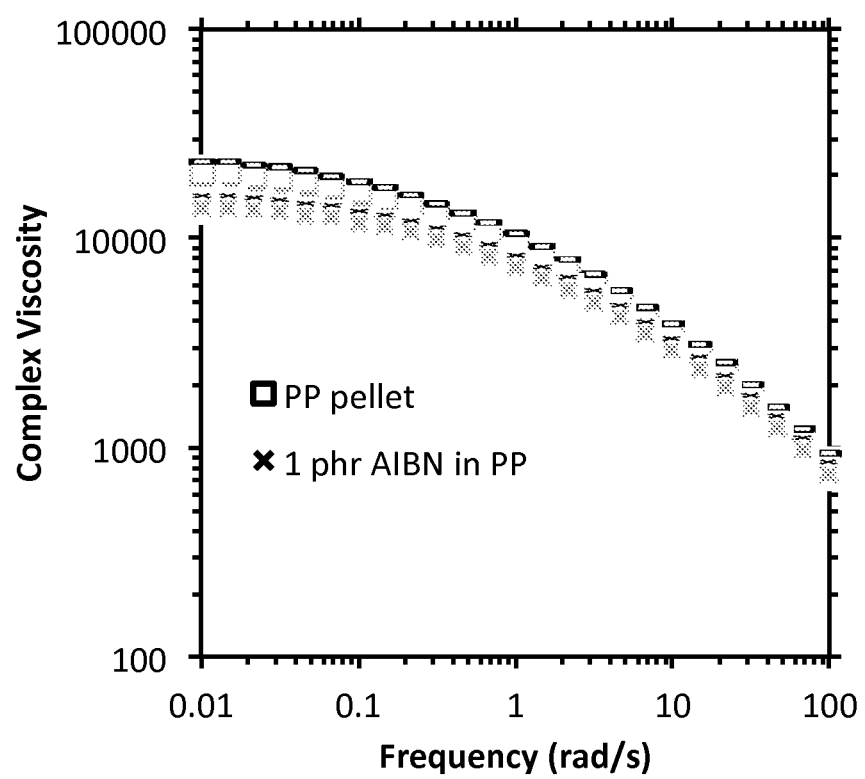

FIG. 3: Comparison between complex viscosities (as a function of frequency) for as received neat PP pellet (□) and PP/AIBN (a sample of 1 phr AIBN pulverized with PP under the same conditions as PP-g-MA samples) (✖). This data was collected at 180° C. and 10% strain, using 25 mm parallel plates and under oscillatory shear conditions.

Figure 4:
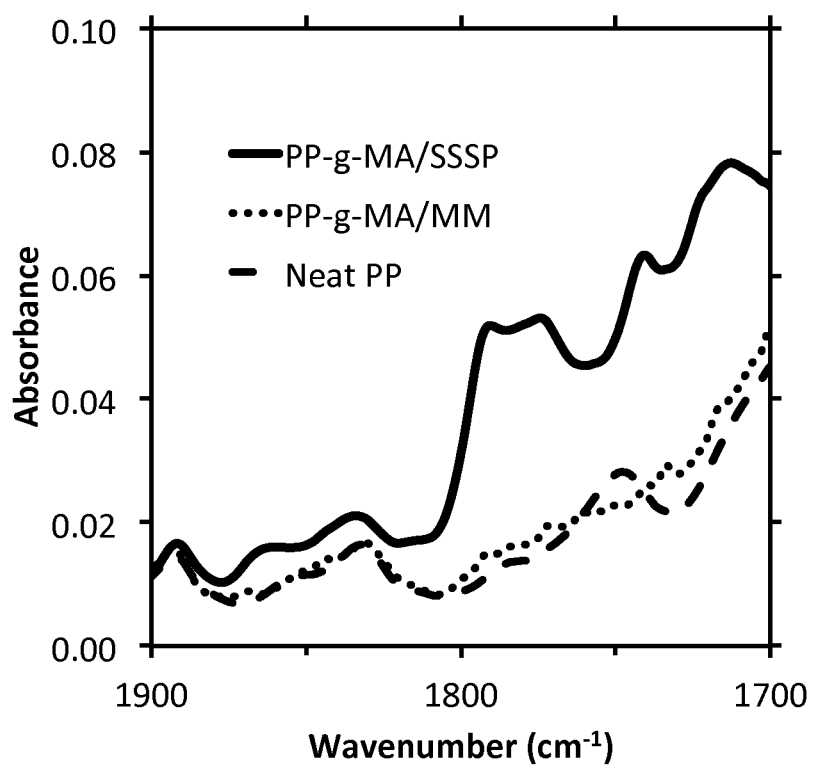

FIG. 4: A comparison between FTIR spectra of PP-g-MA/SSSP (bold line), PP-g-MA/MM (dotted line), and neat PP (dashed line). The comparison shows no clear absorbance associated with anhydride group in PP-g-MA/MM.

Figure 5:
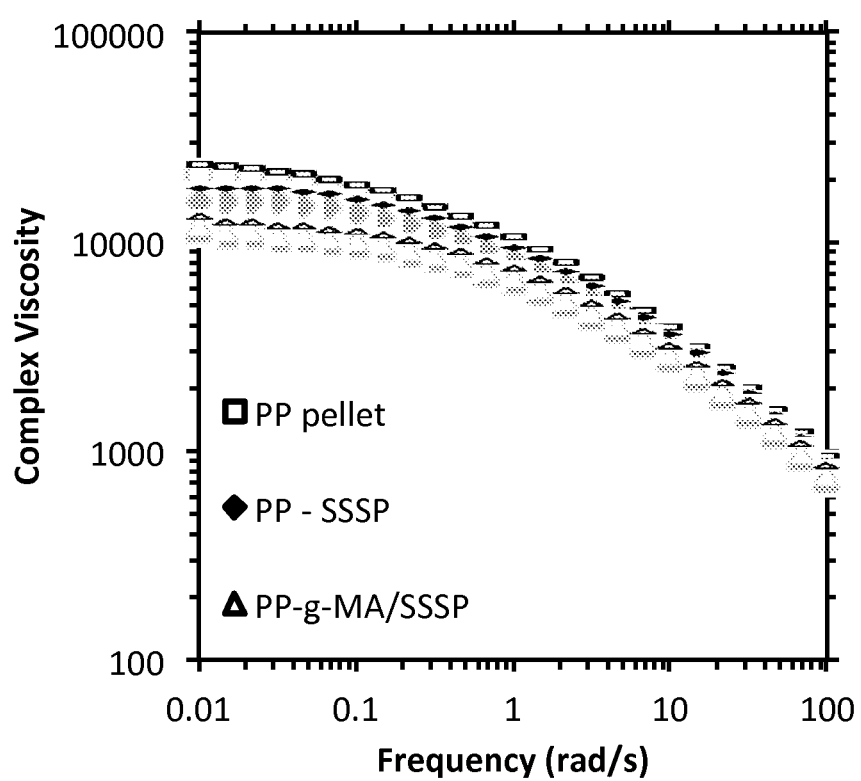

FIG. 5: Comparison between complex viscosities (as a function of frequency) for as received neat PP pellet (□), neat PP pulverized (♦), and PP-g-MA/SSP (Δ). This data was collected at 180° C. and 10% strain, using 25 mm parallel plates and under oscillatory shear conditions.

Figure 6:
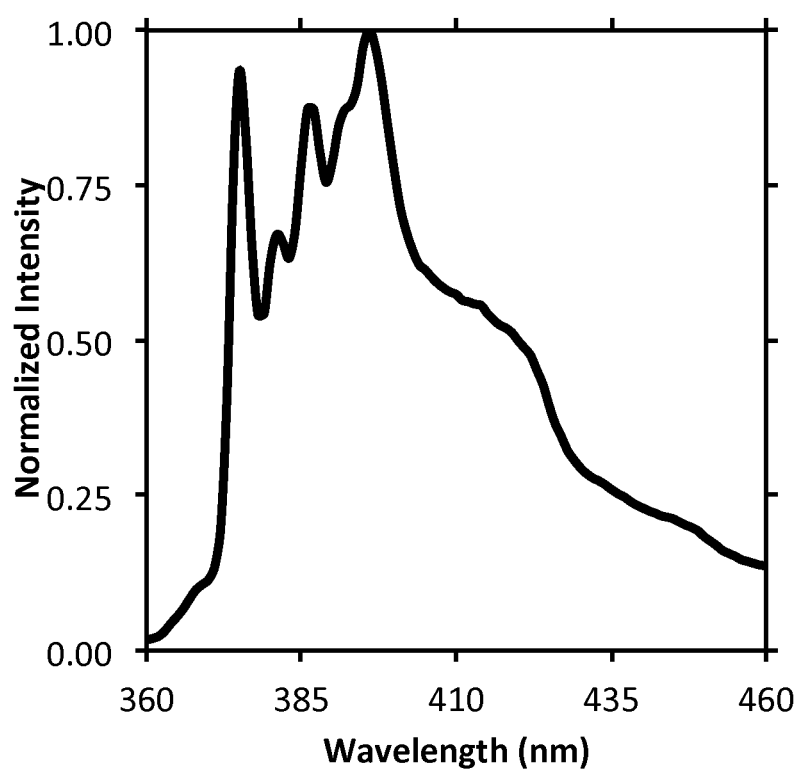

FIG. 6: Fluorescence spectrum of a 0.3 g/L solution of Pyr-MeNH$_2$ in xylene at 100° C. (excitation: 344 nm).

Figure 7:
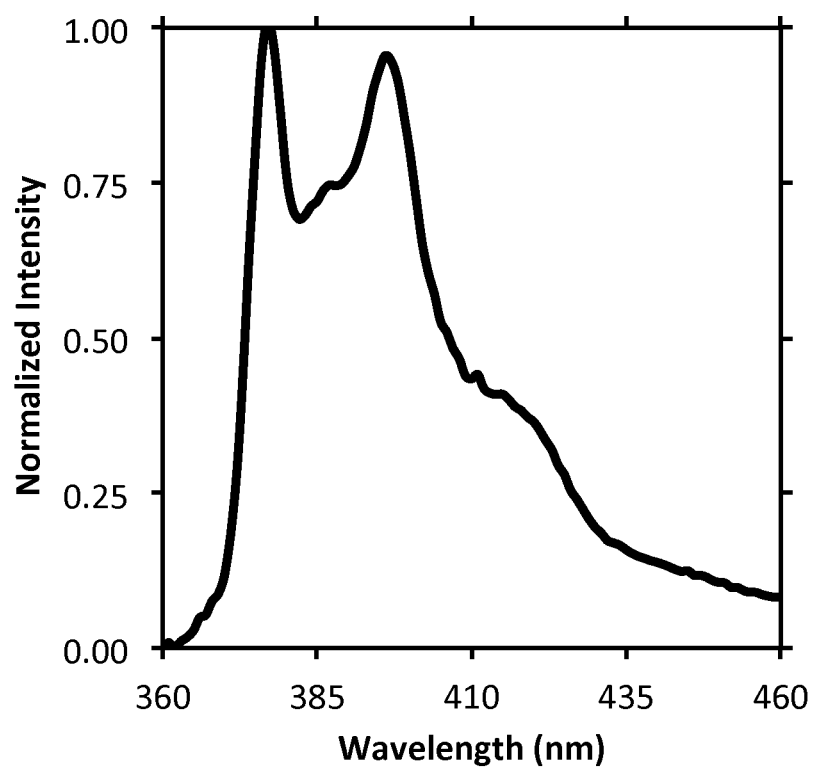

FIG. 7: Fluorescence spectrum of a 20 g/L xylene solution of 20 g/L PP-g-MA/SSSP collected at 100° C. after reaction with Pyr-MeNH$_2$ and then purified six times (excitation: 344 nm).

Figure 8:
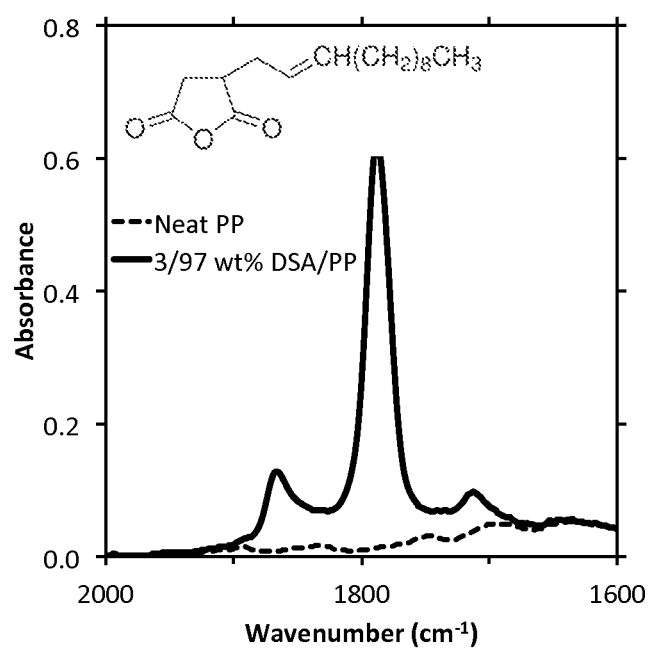

FIG. 8: FTIR spectra of a blend of 3/97 wt % DSA/PP (solid curve) and neat PP (dashed curve). The inserted molecular structure is that of dodecynl succinic anhydride (DSA).

Figure 9:
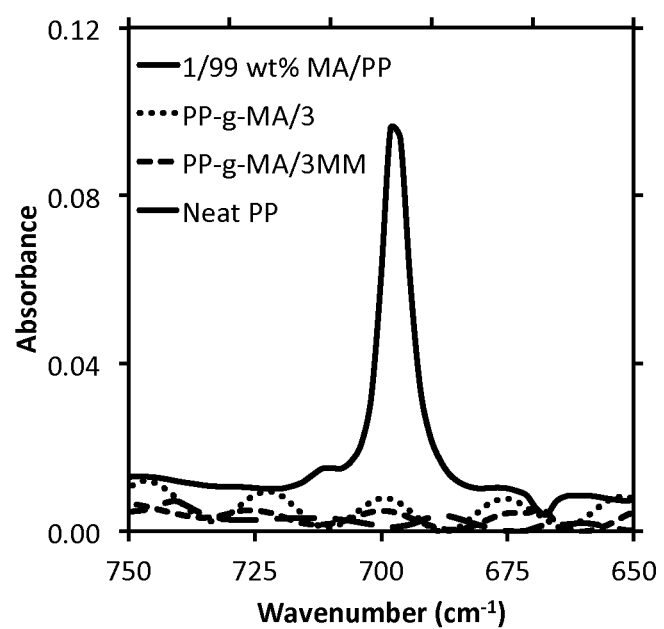

FIG. 9: FTIR spectra of 1/99 wt % MA/PP (bold curve), PP-g-MA/3 (dotted curve), PP-g-MA/3MM (short-dashed curve), and neat PP (long-dashed curve). The comparison shows no absorbance associated with free anhydride moieties in PP-g-MA/3, PP-g-MA/3MM, or neat PP. A very strong absorbance due to free anhydride moieties is observed for the sample of 1/99 wt % MA/PP as expected.

Figure 10:
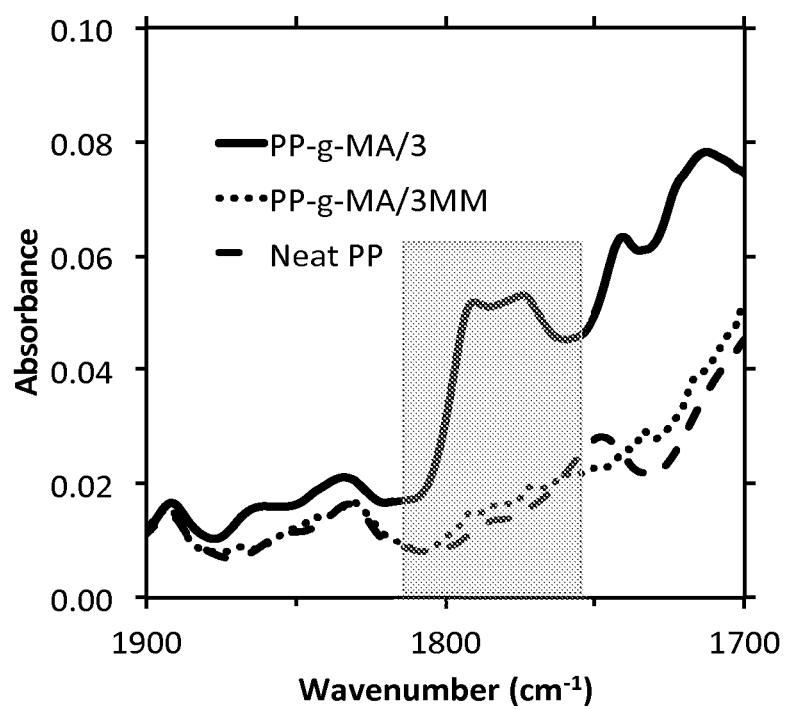

FIG. 10: FTIR spectra of PP-g-MA/3 (bold curve), PP-g-MA/3MM (dotted curve), and neat PP (dashed curve). The comparison shows no clear absorbance associated with anhydride group in PP-g-MA/3MM.

Figure 11:
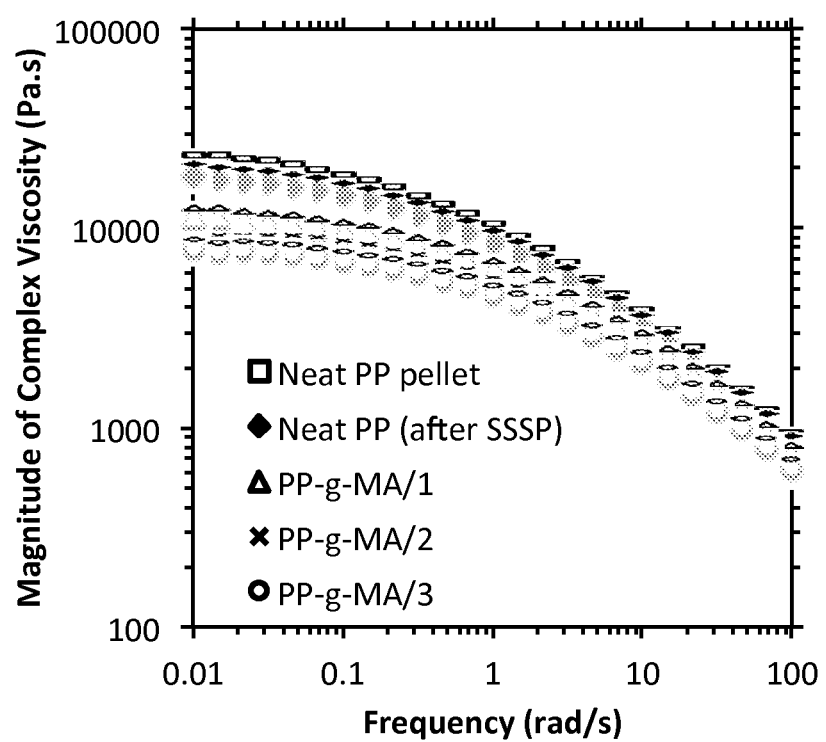

FIG. 11: Magnitude of complex viscosity as a function of frequency for as received neat PP pellet (□), neat PP pulverized (♦), PP-g-MA/1 (Δ), PP-g-MA/2 (✖), and PP-g-MA/3 (○). Data were collected at 180° C.

FIGS. 12A-B: Fluorescence spectra of (a) 0.3 g/L solution of Pyr-MeNH$_2$ in xylene at 100° C.; (b) 20 g/L solution PP-g-MA/3 in xylene at 100° C. after first being reacted with Pyr-MeNH$_2$ and then purified six times by dissolution and precipitation to remove unreacted Pyr-MeNH$_2$. (Both spectra have had emission intensity normalized to unity at the peak emission wavelength.)

DETAILED DESCRIPTION OF CERTAIN EMBODIMENTS

As described herein, solid-state shear pulverization (SSSP) is an innovative, environmentally benign, and industrially scalable process, which can be used to functionalize a PP polymeric component with an α,β-unsaturated carboxy moiety or a derivative thereof while suppressing the molecular weight reduction that occurs as a result of β-scission. Without limitation, certain embodiments of this invention can be illustrated through the functionalization of PP with MA. Further advantages of SSSP over existing technologies can be identified: unlike ball milling and solvent processing, SSSP is a continuous, industrially scalable, and high throughput process; compared to solvent processing, SSSP avoids the use of copious amounts of hazardous solvents; and relative to other processing methods SSSP is very versatile as a result of the ease with which product properties can be fine-tuned by changing operating conditions (e.g. screw design, screw speed, feed rate, and zone temperatures).

As discussed below, major benefits from an SSSP apparatus employed in conjunction with the present methodologies relate to the ability to cool the barrel to a temperature sufficiently low enough to maintain the polymeric material in the solid state and the use of tri- and/or bi-lobe screw elements along a portion of the pulverizer screw. Details regarding SSSP processes and equipment (e.g., component construction, screw elements, transport elements, kneading or shearing elements, and spacer elements and/or the sequence or design thereof selected or varied as required to accommodate a polymer starting material, pulverization parameters and/or a resulting pulverized polymer product) are known to those skilled in the art made aware of this invention. (See, e.g., Furgiuele, N.; Lebovitz, A. H.; Khait, K.; Torkelson, J. M. *Macromolecules* 2000, 33, 225-228; Furgiuele, N.; Lebovitz, A. H.; Khait, K.; Torkelson, J. M. *Polym Eng. Sci* 2000, 40, 1447-1457; Lebovitz, A. H.; Khait, K.; Torkelson, J. M. *Macromolecules* 2002, 35, 8672-8675; Kasimatis, K. G.; Torkelson, J. M. PMSE Prepr 2005, 92, 255-256; Tao, Y.; Kim, J.; Torkelson, J. M. *Polymer* 2006, 47, 6773-6781; Walker, A. M.; Tao, Y.; Torkelson, J. M. *Polymer* 2001, 48, 1066-1074; Lebovitz, A. H.; Khait, K.; Torkelson, J. M. *Polymer* 2003 44, 199-206; Brunner, P. J.; Clark, J. T.; Torkelson, J. M.; Wakabayashi, K. *Polymer Engineering and Science* 2012, 52, 1555-1564; and U.S. Pat. Nos. 5,814,673; 6,180,685; and 7,223,359—each of which is incorporated herein by reference in its entirety.)

Without limitation, in the context of this invention, SSSP can be accomplished with a Model ZE 25 Berstoff twin-screw extruder modified with a cooling system. The screw design for this modified extruder is made up of two segments. The first segment is made up of spiral conveying and bi-lobe kneading elements in the first segment; the second segment is made up of tri-lobe shearing elements. This pulverizer has a barrel length-to-diameter ratio of 26.5. In the first segment, where the screw elements have a diameter of 25 mm, the length-to-diameter ratio of the barrel is 19. The second segment has screw elements with a diameter of 23 mm and length-to-screw diameter ratio of 7.5 for the barrel. The cooling system, which operates at −6° C., is controlled by circulating a 60/40 wt % glycol/water mixture using a Budzar Industries WC-3 chiller. Such low operating temperatures allow materials to be processed in their solid state (i.e., below their melting or glass temperatures). This pulverizer uses high shear and compressional forces to cause fragmentation and fusion of materials. Processing in the solid-state helps to overcome thermodynamic and kinetic limitations that may be associated with melt processing. It also suppresses degradation that occurs as a result of β-scission under high temperature conditions. As well as being continuous, SSSP is environmentally benign and scalable to commercial levels.

More generally, SSSP is not limited to the system described above. Components for accomplishing SSSP include an extruder that is modified with a cooling or heat transfer medium such that materials are retained in the solid state during pulverization. This modification may involve, but is not limited to a cooling system and medium jacketed around the barrel, and/or a cooled screw, and/or a heat transfer system and medium that operates at a temperature above room temperature and is jacketed around the barrel. Pulverization itself is accomplished via the use of an extruder that has bi-lobe elements or tri-lobe elements or a combination of bi- and tri-lobe elements, such that sufficient work can be can be performed on the material in its solid-state to result in the desired reaction.

With reference to FIG. 2, an SSSP apparatus utilizes mixing, conveying, and pulverization zones, each with screws of a different combination of conveying, mixing, and shearing elements. The level of the applied shear stress can be tuned by altering the type of screw applied. For example, using reverse shearing elements results in making the screw "harsher" and increases the residence time in the apparatus;

using forward shearing elements results in making the screw less "harsh" and reduces the residence time. The material enters as pellets but exits the pulverizer in the solid state as powder, flakes, or particulate.

For PP functionalization with MA, azobisisobutyronitrile (AIBN) was chosen as the free-radical initiator. Azobisisobutyronitrile is used for several reasons. Among these, AIBN has a half-life of 1 hr at 82° C. while dicumyl peroxide (DCP), a commonly used peroxide for PP functionalization via melt processing, has a half-life of 1 hr at 132° C. and benzoyl peroxide (BPO) has a half-life of 1 hr at 91° C. For this reason, AIBN results in the formation of more radicals under the near-ambient temperature conditions used for SSSP than both DCP and BPO, therefore making it more suitable for SSSP. Additionally, AIBN was chosen because its radicals do not participate in significant levels of chain transfer with PP (See Zweifel, H. *Stabilization of polymeric materials*; 1st ed.; Springer: Berlin, N.Y., 1998; p. 219). Thus, the presence of un-decomposed AIBN after SSSP does not raise any concern associated with AIBN radical chemistry during post-SSSP processing. FIG. 3 shows a comparison between complex viscosity, η* (Pa·s), as a function of frequency, ω (rad/s) for neat PP and PP-AIBN (a sample of 1.0 phr AIBN in PP) that was pulverized. Values of zero shear rate viscosity ($\eta_o$) were determined directly from rheology data. Assuming that $\eta_o$ dependence on weight average molecular weight, Mw, of a monodisperse entangled polymer, i.e., $\eta_o \sim M_w^{3.4}$ (See Fox, T. G.; Flory, P. J. *Journal of Physical and Colloid Chemistry* 1951, 55, 221-234; Ferry, J. D. *Viscoelastic Properties of Polymers*; Wiley: New York, 1980; p. 641; Dealy, J. M.; Wissbrun, K. F. *Melt Rheology and its Role in Plastics Processing*; Van Nostrand Reinhold: New York, 1990; p. 665.) holds for such samples (which are polydisperse), approximations of $M_w$ reduction can be made from flow data. (Reference is made to the following examples for a more complete discussion.) The addition of 1.0 phr AIBN to PP did not cause a dramatic loss in $M_w$ (i.e., ~10%). Since the residence time of material in the pulverizer is short (~7 min), only a small amount of the AIBN would have decomposed during SSSP. The remaining AIBN decomposes during post SSSP processes such as melt processing, which was used to consolidate the material before compression molding into pellets at 200° C. FIG. 3 confirms that AIBN does not participate significantly in chain transfer with PP and that having un-decomposed AIBN in the SSSP product will not result in dramatic $M_w$ reduction during post-functionalization processing via melt processing.

The resulting pulverization products were purified and pressed into thin films for Fourier Transform Infrared (FTIR) spectroscopy. The purification was done by dissolution in boiling xylene followed by precipitation with methanol, which has proven to be the most reliable method of removing any unreacted maleic anhydride from the samples. The FTIR spectra were collected at room temperature and used to qualitatively and quantitatively characterize the MA grafted onto the PP. For all spectral analyses, the data in the regions of interest (between 1900 and 1650 cm$^{-1}$ and between 1200 and 1100 cm$^{-1}$) were deconvoluted into component peaks using a Lorentzian function. A calibration curve, based on dodecynl succinic anhydride, was determined and used to quantitatively characterize the amount of MA moieties grafted onto PP. FIG. 4, below, shows a comparison between FTIR spectra of a sample of neat PP, PP-g-MA prepared via SSSP (PP-g-MA/SSSP), and a sample of PP-g-MA prepared via melt processing (PP-g-MA/MM). The absorbance peaks, only present for the PP-g-MA sample prepared via SSSP, at 1890 cm$^{-1}$ and 1780 cm$^{-1}$ are characteristic of the carbonyl groups of maleic anhydride moieties. Quantitative analyses based on FTIR spectroscopy have indicated that up to about 0.70 wt % or more MA can be grafted onto PP via SSSP under the conditions employed.

A comparison between complex viscosities of neat PP pellet (as received), neat PP (pulverized), and a sample of ~0.3 wt % MA in PP-g-MA is graphically illustrated in FIG. 5 below. Estimates of molecular weight reduction made from rheology data indicate that for a sample of PP-g-MA, processed via SSSP, the molecular weight reduction is about 15-about 25% relative to the neat PP from which it was made.

Further comparison was made between MW reduction observed during functionalization via conventional melt processing vs. MW reduction observed during functionalization via SSSP. Using literature references for PP functionalized with MA at similar grafting levels using conventional melt processing, Table 1 details these comparisons and the source of the data. Note that for samples of the invention (under the heading SSSP), the determination of percent reduction in weight average molecular weight is based on approximations made from zero shear rate viscosities, which are obtained from oscillatory shear rheology. The MA grafting levels for such samples were obtained from approximations based on FTIR spectra. Thin films of purified samples were prepared via compression molding and then used for FTIR analysis. The data presented in Table 1 demonstrates that MA functionalization of PP via SSSP results in suppression of MW reduction as compared to their melt-processed counterparts with similar MA grafting levels (i.e., wt % MA).

TABLE 1

Comparison between percent reduction in weight average molecular weight of PP-g-MA samples with comparable MA grafting levels prepared via SSSP or melt processing

| Level of MA grafting (wt %) | % Reduction in Weight Average Molecular Weight | |
|---|---|---|
| | SSSP | Melt Processing |
| 0.27 | 16 | 45[1] |
| 0.46 | 25 | 71[2] |

[1]Ni, Q.-L.; Fan, J.-Q.; Niu, H.; Dong, J.-Y. *Journal of Applied Polymer Science* 2011, 121, 2512-2517; and
[2]Shi, D.; Yang, J.; Yao, Z.; Wang, Y.; Huang, H.; Jing, W.; Yin, J.; Costa, G. *Polymer* 2001, 42, 5549-5557.

A comparison of approximate $M_w$ values shows that samples prepared using the present invention tend to have higher values than those prepared via melt processing, at similar MA grafting levels. (See Table 2, below.) Weight average molecular weights for inventive samples (under the heading SSSP) approximated after determining the $M_w$ of the starting PP using a correlation with melt flow indices (MFI's) determined for ASTM standard D1238 for PP; i.e., at 230° C. and using 2.16 kg. (See, Bremner, T., Rudin, A. & Cook, D. G. *Journal of Applied Polymer Science*, 1990, 41, 1617-1627) The same correlation was used to determine approximate MW for Exxelor 1020, a commercial PP-g-MA sample. Molecular weight values for the other commercial samples were found in literature (as cited in Table 2). Note that the MW values for PP functionalized via SSSP are higher than the typical values of PP functionalized to similar MA grafting levels via melt processing. Thus, even though SSSP results in the suppression of MW reduction during PP functionalization with MA, the approximate MW's of such polymers prepared using SSSP are greater than the typical MW's obtained from conventional melt processing.

TABLE 2

Comparison between weight average molecular weight of PP-g-MA samples with comparable MA grafting levels prepared via SSSP or melt processing

| Level of MA grafting (wt %) | Weight Average Molecular Weight (g/mol) | | |
|---|---|---|---|
| | SSSP | Melt Processing (Literature) | Melt Processing (Commercial Samples) |
| 0.27 | 370,000 | 180,000[1] | 165,000[3] (Polybond 3002) 105,000[3] (Exxelor 1015) |
| 0.46 | 350,000 | 80,000[2] | 55,000 (Exxelor 1020) |

[1]Ni, Q.-L.; Fan, J.-Q.; Niu, H.; Dong, J.-Y. *Journal of Applied Polymer Science* 2011, 121, 2512-2517;
[2]Shi, D.; Yang, J.; Yao, Z.; Wang, Y.; Huang, H.; Jing, W.; Yin, J.; Costa, G. *Polymer* 2001, 42, 5549-5557; and
[3]Sclavons, M.; Carlier, V.; De Roover, B.; Franquinet, P.; Devaux, J.; Legras, R. *Journal of Applied Polymer Science* 1996, 62, 1205-1210.

The non-limiting examples summarized in Tables 1-2 demonstrate that it is, in fact, possible to functionalize PP with MA while suppressing percent MW reduction, yet improve overall MW values at comparable MA grafting levels.

The reactivity of the SSSP-synthesized PP-g-MA samples was verified by reaction with 1-pyrenemethylamine (Pyr-MeNH$_2$), a two-step process that begins with the amine opening of the anhydride followed by a ring closing step. (See, Padwa, A. R.; Sasaki, Y.; Wolske, K. A.; Macosko, C. W. *Journal of Polymer Science Part A: Polymer Chemistry* 1995, 33, 2165-2174.) For this imidization reaction, the PP-g-MA samples were dissolved in 0.3 g/L solutions of Pyr-MeNH$_2$ in xylene. The solutions were heated to 100° C. and held at this temperature for two hours. The PP-g-MA was then precipitated with methanol. Each sample was purified six times by dissolution in boiling xylene followed by precipitation with methanol, to remove unreacted Pyr-MeNH$_2$. Fluorescence spectra were obtained using a Photon Technology International fluorimeter and at an excitation wavelength of 344 nm.

FIG. 6 shows the fluorescence spectrum of a solution of 0.3 g/L Pyr-MeNH$_2$ in xylene, collected at 100° C. and with an excitation wavelength of 344 nm. FIG. 7 shows the fluorescence spectrum of PP-g-MA/SSSP, a PP-g-MA sample synthesized via SSSP (and after reaction with Pyr-MeNH$_2$ and subsequent purification). It is evident, based on a comparison between the spectra in FIGS. 6 and 7 that after several purifications PP-g-MA/SSSP retains significant pyrene content—proof of covalently attached Pyr-MeNH$_2$. As expected, this is not the case for control samples (i.e., control PP-g-MA/MM or neat PP) that did not contain MA functionality. These results confirm that PP functionalization with MA via SSSP results in significant MA grafting levels while melt processing does not. MA incorporation can be optimized with consideration of PP starting material and SSSP conditions and parameters.

EXAMPLES OF THE INVENTION

The following non-limiting examples and data illustrate various aspects and features relating to the methods of the present invention, including polyolefin functionalization, as is available through the methodologies described herein. With the prior art, the present methods and resulting functionalized polymers provide results which are surprising, unexpected and contrary thereto. While the utility of this invention is illustrated through the use of several polyolefins, functionalization components and free-radical initiators, it will be understood by those skilled in the art that comparable results are obtainable with various other polymers, functionalization components and free radical initiators, as are commensurate with the scope of this invention.

Materials

Polypropylene (Total Petrochemicals; MFI=2.0 g/10 min; ASTM standard D-1238 at 230° C./2160 g load; reported by the supplier) was used as received. Azobisisobutyronitrile (AIBN) and MA were used as received (SigmaAldrich). A phenolic antioxidant, Songnox 6260 (Songwon), was used as received in samples made for rheological characterization. Xylene, dodecynl succinic anhydride (DSA), ammonium hydroxide (28% w/w aqueous solution), and 1-pyrenemethylamine hydrochloride were used for characterizing MA grafting levels and reactivity of the PP-g-MA and were used as received (SigmaAldrich). 1-pyrenemethylamine (Pyr-MeNH$_2$) was synthesized by stirring 1-pyrenemethylamine hydrochloride and ammonium hydroxide in xylene solution for several hours at room temperature, allowing for migration of hydrochloride into the aqueous phase and Pyr-MeNH$_2$ into the xylene phase; separation was by decantation.

Example 1

Synthesis of PP-g-MA with SSSP

Dry mixed samples of PP, MA, and AIBN were pulverized using a relatively harsh screw design at 200 rpm screw speed and 100 g/hr feed rate. The pulverizer was a pilot-plant/research scale Berstoff twin-screw extruder (screw diameter=25 mm, length/diameter=26.5) modified with a cooling system (a Budzar Industries WC-3 chiller at −6° C.); the same apparatus was used in previous SSSP studies. Samples of PP-g-MA were prepared by SSSP using 4.0 wt % MA and 0.5, 1.0, or 1.5 wt % AIBN. (The amount of MA is without limitation. Optionally, 0.01, 0.01, 0.5 . . . or up to about 10 wt % or more can be utilized.) A control was prepared by SSSP with 1.0 wt % AIBN but without MA. A PP-g-MA sample with feed composition of 4.0 wt % MA and 1.5 wt % AIBN was also prepared by melt mixing for 10 min at 200° C. in an Atlas Electronic Devices MiniMAX molder (cup-and-rotor mixer) at maximum rotor speed and with three steel balls in the cup to provide chaotic mixing. Table 3 shows sample composition and process methods. In addition to the samples in Table 3, a sample was made with 1.0 wt % benzoyl peroxide (BPO; SigmaAldrich) in PP by SSSP using the same process conditions as for PP/AIBN; this sample was prepared in order to compare the effect of undecomposed AIBN vs. BPO on the MW degradation of SSSP products during post-SSSP melt processing.

Example 2

Rheological Measurements

Neat PP and PP-g-MA samples were used without purification but with 0.5 wt % Songnox 6260 added to each sample to prevent thermal degradation. Samples were compression molded into discs devoid of bubbles. Oscillatory shear rheology data were collected at 180° C., with 10% strain over a frequency range of 0.01 to 100 rad/s (measuring from high to low frequency), using a strain-controlled Rheometrics Scientific ARES rheometer equipped with 25 mm parallel plates.

Example 3

Physical and Mechanical Properties

Properties were measured for neat PP and SSSP output (PP-g-MA) without purification. A Mettler Toledo differential scanning calorimeter (DSC 822e) was used for thermal analysis. Samples were heated at 40° C./min to 200° C., held at 200° C. for 5 min, cooled at 40° C./min to 40° C., held at 40° C. for 3 min, heated at 10° C./min to 200° C., held at 200° C. for 5 min, and cooled at 10° C./min to 40° C. The crystallinity was determined from the final cooling step. Both peak and endpoint temperatures of the melting endotherm (10° C./min) were reported.

Films with ~0.5 mm thickness were prepared by pressing in a PHI hot press at 200° C. for 5 min and then rapidly cooling in a PHI cold press at 16° C. for 15 min. Tensile specimens were prepared according to ASTM D1708; dumbbell-shaped specimens were cut from films using a Dewes-Gumbs die. An MTS Sintech 20/G (100 kN load cell; crosshead speed=5 cm/min) was used to obtain Young's modulus and yield strength values at room temperature.

TABLE 3

Variables for Sample Composition and Processing Method

| Sample | MA Added (wt %) | AIBN Added (wt %) | Processing Method |
|---|---|---|---|
| Neat PP Pellet (as received) | — | — | — |
| Neat PP (after SSSP) | — | — | SSSP |
| PP/MA | 1.0 | — | Dry mixing of component powders |
| PP/AIBN | — | 1.0 | SSSP |
| PP-g-MA/1 | 4.0 | 0.5 | SSSP |
| PP-g-MA/2 | 4.0 | 1.0 | SSSP |
| PP-g-MA/3 | 4.0 | 1.5 | SSSP |
| PP-g-MA/3MM | 4.0 | 1.5 | Melt Mixing |

Example 4

Quantification of MA Grafting

For this characterization, PP-g-MA samples made by SSSP or melt mixing were purified to remove any unreacted MA by dissolution in boiling xylene followed by precipitation with methanol. The samples were dried in a vacuum oven at 70° C.

In order to create a calibration curve, DSA/PP blends were prepared by melt processing at 200° C. in a MiniMAX molder for 10 min and at maximum rotor speed with three steel balls in the cup in order to provide chaotic mixing. Blend products were compression molded into thin films (~0.3 mm thick) for Fourier transform infrared (FTIR) spectroscopy. Dodecenyl succinic anhydride was chosen because of its structural similarity to PP-g-MA. For each blend, three sets of FTIR data were collected with 64 scans and 4 cm$^{-1}$ resolution. Purified PP-g-MA samples were compression molded into thin films (~0.3 mm thick) and tested under the same conditions as DSA/PP blends. For PP/MA (prepared with 1 wt % MA powder dry mixed with PP), the FTIR spectrum was collected using a disc prepared from the sample powder and potassium bromide.

Example 5

Demonstration of Reactivity of PP-g-MA with Pyr-MeNH$_2$

The reactivity of purified PP-g-MA was verified by reaction with Pyr-MeNH$_2$. In order to achieve this imidization reaction, 50 g/L PP-g-MA samples were dissolved in 0.30 g/L solutions of Pyr-MeNH$_2$ in xylene. Solutions were held at 100° C. for 2 hr, after which PP-g-MA was precipitated in methanol. To remove unreacted Pyr-MeNH$_2$, samples were purified six times by dissolution in boiling xylene followed by precipitation in methanol. Pyrene label fluorescence was measured with a Photon Technology International fluorimeter ($\lambda_{exc}$=344 nm).

Example 6

Quantitative Characterization of MA Grafting Levels

Table 4 shows the locations of peaks associated with three unique cyclic anhydride absorptions in the 1900-1700 cm$^{-1}$ infrared region. There is no significant absorbance from PP in this region, as shown in FIG. 8 by a comparison of FTIR spectra of a 3/97 wt % DSA/PP blend and neat PP. A peak at 1170 cm$^{-1}$ is used for normalization (absorbance of 1.00) of each sample spectrum. This peak is specific to PP and absent for MA. For all spectral analyses, the data between 1900 and 1650 cm$^{-1}$ and between 1240 and 1070 cm$^{-1}$ were deconvoluted into component peaks using a Lorentzian function. This yielded accurate peak intensities while accounting for peak overlaps and inconsistent baselines between spectra. A calibration curve based on DSA was determined using the analysis described above:

$$[\text{Anhydride}]=0.96(I_{1790}/I_{1170})+7.87(I_{1713}/I_{1170}) \qquad \text{Eq. 1}$$

where the anhydride concentration is in weight percent and $I_{1790}$, $I_{1713}$, and $I_{1170}$ are peak intensities at 1790, 1713, and 1170 cm$^{-1}$, respectively.

Graft levels of PP-g-MA made by SSSP were quantified using Eq. 1: see Table 3. To verify that all free MA molecules had been removed by purification, we inspected FTIR spectra for a peak located between 710 and 690 cm$^{-1}$. Absorbance in that region is as a result of out-of-plane =C—H bond stretch associated with free MA (grafted MA does not show this absorbance). The presence of such a peak in a mixed sample of 1/99 wt % MA/PP (containing free rather than grafted MA) and its absence in all of our purified PP-g-MA samples indicates that our purification led to essentially complete removal of free MA. (See FIG. 9.) While PP-g-MA prepared by SSSP resulted in 0.3 to 0.5 wt % grafting levels (more specifically, 0.27±0.04 to 0.47±0.04 wt % MA), PP-g-MA/3MM (see Table 5) prepared by melt processing resulted in no significant grafting of MA, consistent with the discussion above. A comparison of FTIR spectra for neat PP, PP-g-MA/3, and PP-g-MA/3MM is shown in FIG. 10, which demonstrates that PP-g-MA/3MM has no discernable level of MA grafting.

In FIG. 10, the FTIR spectrum for PP-g-MA/3 exhibits two peaks at ~1790 and ~1780 cm$^{-1}$. The peak at ~1780 cm$^{-1}$ may be from oligomeric chains of MA grafted to PP. However, homopolymerization of MA during PP functionalization is a controversial issue. The argument against MA homopolymerization during high-temperature functionalization of PP is based on the fact that the ceiling temperature for homopolymerization of MA in benzene is 160° C.

Temperatures above the ceiling temperature favor depolymerization over polymerization. Some studies have reported evidence of MA oligomer grafts to PP by melt functionalization, which was ascribed to effects of local MA concentration on ceiling temperature. There is also evidence for MA oligomer grafts in some PP-g-MA syntheses at temperatures below 160° C. Because PP-g-MA synthesis by SSSP occurs at low temperature and based on our observation of a peak at 1780 cm−1, it is possible that PP-g-MA prepared by SSSP contains some MA oligomers grafted onto PP.

TABLE 4

Characteristic peaks associated with cyclic anhydride absorption in the infrared region

| Wavenumber (cm$^{-1}$) | Characteristic bond |
| --- | --- |
| 1730-1700 | C=O stretch of carboxylic acid of hydrolyzed anhydride |
| 1800-1775 | Asymmetric C=O stretch (strongest peak) |
| 1870-1845 | Symmetric C=O stretch |

TABLE 5

Characterization of MA grafting levels, $M_w$ reduction from $\eta_o$ data, crystallinity, and tensile properties for neat PP and PP-g-MA samples made via SSSP

| Sample | MA grafting level a (wt %) | Percent Mw reduction b (%) | Crystallinity (%) | Young's Modulus (MPa) | Yield Strength (MPa) |
| --- | --- | --- | --- | --- | --- |
| Neat PP pellets (as received) | — | — | 47 | 1340 ± 20 | 38 ± 1 |
| Neat PP (after SSSP) | — | 3 | 48 | 1400 ± 90 | 37 ± 2 |
| PP-g-MA/1 | 0.27 ± 0.04 | 16 | 47 | 1300 ± 70 | 34 ± 1 |
| PP-g-MA/2 | 0.32 ± 0.05 | 20 | 48 | 1300 ± 100 | 33 ± 1 |
| PP-g-MA/3 | 0.47 ± 0.04 | 25 | 48 | 1200 ± 30 | 34 ± 1 | a MA grafting levels expressed in wt % can be converted into units of µeq (i.e., the number of moles of MA in 1 g of PP-g-MA multiplied by 10$^6$) by simple stoichiometric calculations (e.g., 0.3 wt % MA is equivalent to ~31 µeq).
b Percent reduction in $M_w$ relative to neat PP pellets (as received) was calculated using the assumption that $\eta_o$ scales with $M_w$ to the 3.4 power Example 7

Molecular Weight Characterization and Molecular Weight Reduction in PP-g-MA

High-temperature GPC data were obtained for neat PP pellets (as received) and PP-g-MA/3. Molecular weight averages were evaluated by high-temperature GPC (at 145° C. with trichlorobenzene as eluent and triple-detection) at the Polymer Characterization Lab at the University of Tennessee, Knoxville, Tenn. 37996. Samples were dissolved in trichlorobenzene and tested at 145° C.; a triple detection method was used. Using trichlorobenzene as solvent, GPC samples were run at 145° C. and analyzed with light scattering, triple detection, and universal calibration. Similar results are obtained when $M_n$ and $M_w$ are averaged across the three detection methods. Using averaged $M_n$ and $M_w$ values for neat PP pellets ($M_n$=136,000 g/mol and $M_w$=519,000 g/mol) and PP-g-MA/3 ($M_n$=126,000 g/mol and $M_w$=358,000 g/mol), the percent reduction in $M_n$ and $M_w$ are determined as 7% and 31%, respectively, very close to the reductions reported in section 4.3. The MW values from these samples, as well as those reported for PP-g-MA synthesis via reactive extrusion by Shi et al., are presented in Table 6.

Both PP-g-MA/3 (made by SSSP) and PP-g-MA/RE (made by reactive extrusion) have MA grafting levels of ~0.5 wt %. Based on the 0.5 wt % grafting level and 32,000 g/mol number-average MW ($M_n$) value reported for PP-g-MA/RE, on average one to two MA units are incorporated in each PP chain. This result is consistent with the idea that the extent of β-scission is high during reactive extrusion and that most of the radicals that participate in MA grafting, and thus the MA functional groups themselves, are located at PP chain ends. In contrast, the 0.5 wt % grafting level for PP-g-MA/3 with $M_n$=89,000 g/mol indicates that four to five MA units are incorporated in each PP chain. Unlike the sample made by reactive extrusion, the PP-g-MA made by SSSP has the MA functional groups distributed along the chain length rather than being located predominantly at chain ends. This is evident from the discussion below.

Using $M_n$ values, the average number of scission events per chain can be determined with the following analysis. Starting with one chain, one scission event will result in two chains, two scission events will result in three chains, etc. This relationship between the number of scission events and the number of chains results in Eq. 2, which relates the average number of scission events per chain, $z_c$, to change in $M_n$:

$$z_c = [M_{n,o}/M_{n,f}] - 1 \qquad \text{Eq. 2}$$

where $M_{n,o}$ is the initial $M_n$, and $M_{n,f}$ is the final $M_n$ after scission. Based on Eq. 2, $z_c$=0.090 scission events per chain for PP-g-MA/3, i.e., for every 100 original PP chains, there were 9 scission events. If each scission event during SSSP resulted in a radical at each of two chain ends that was capable of adding an MA functional group, then 18 MA functional groups could be added per 109 PP chains present after scission. However, given the ~0.5 wt % MA grafting level, these 109 chains would contain ~400-500 MA units, a factor of ~25 higher than the number of chain ends created by scission. While it is possible that some chain-end radicals may result in incorporation of more than one MA functional group, the low propensity of MA to undergo homopolymerization and the low MA concentration used in the SSSP process argue strongly against the notion that most MA functional groups are present as homopolymer grafted onto PP chain ends. Instead, a high level of the MA functional groups must be incorporated at locations along the chain length other than chain ends.

Equation 2 also allows us to compare the frequency of scission events per chain for PP-g-MA synthesis by SSSP ($z_c$=0.090) with that by reactive extrusion ($z_c$=1.03). Given that the $M_{n,o}$ values were different for PP-g-MA/3 and PP-g-MA/RE, an appropriate comparison requires that we determine the frequency of scission events per repeat unit in each system. Taking into account that the initial number-average degree of polymerization was 2205 for PP-g-MA/3 and 1477 for PP-g-MA/RE, then one scission event occurs per 24,500 repeat units with PP-g-MA/3 and per 1430 repeat units in PP-g-MA/RE. Thus, with the synthesis of PP-g-MA with 0.5 wt % MA graft level, SSSP suppresses the frequency of chain scission per repeat unit by ~94% relative to reactive extrusion.

Table 6 also shows the percent reduction in $M_w$ for PP-g-MA/3 and PP-g-MA/RE. These reductions in $M_w$ (32% for PP-g-MA/3 and 71% for PP-g-MA/RE) are significantly larger than the reductions in $M_n$ (8% for PP-g-MA/3 and 51% for PP-g-MA/RE). This is expected because the probability that a chain undergoes β-scission is proportional to the number of repeat units in the chain. Hence, a chain with five times the repeat units of a shorter chain with have five times the frequency of scission events of the shorter chain, and $M_w$ will thereby suffer a greater percentage reduction than $M_n$. Nevertheless, synthesis of PP-g-MA by SSSP results in much smaller reductions in $M_n$ and $M_w$ (based on high-T GPC characterization) relative to those achieved by reactive extrusion. (If we had employed a neat PP sample with $M_n$ identical to the 65,000 g/mol sample used by Shi et al., then SSSP would have led to only a 6% reduction in $M_n$, from 65,000 to 61,300 g/mol.)

TABLE 6

High-T GPC Characterization of $M_n$ and $M_w$ before and after Functionalization via SSSP and Reactive Extrusion

| Sample | Mn (g/mol) | Percent Mn reduction (%) | Mw (g/mol) | Percent Mw reduction (%) |
|---|---|---|---|---|
| PP-g-MA synthesis via SSSP | | | | |
| Neat PP pellets (as received) | 97,000 | — | 397,000 | — |
| PP-g-MA/3 | 89,000 | 8 | 268,000 | 32 |
| PP-g-MA synthesis via Reactive Extrusion | | | | |
| Neat PP (as received) | 65,000 | — | 273,000 | — |
| PP-g-MA/RE | 32,000 | 51 | 80,000 | 71 |

Most previous studies of MW reduction accompanying PP-g-MA synthesis via post-polymerization did not report any $M_n$ values nor $M_w$ values based on high-T GPC; instead, they reported results that may be interpreted in terms of $M_w$ based on viscosity or MFI characterization. In order to make a fair comparison between studies as well as to compare the effects of MA graft level in our own study, we have also used rheology to characterize the apparent reduction in $M_w$ in our three PP-g-MA samples made by SSSP. FIG. 11 shows |η*| as a function of frequency for PP-g-MA and control samples. Values of $\eta_o$ were calculated by employing the Cox-Merz rule and the Cross model. (It is worth noting that neither the control nor PP-g-MA samples show any signs of chain branching.) We characterized the effect of SSSP processing and MA functionalization on $M_w$ reduction by assuming that $\eta_o$ scales with the 3.4 power of $M_w$. As shown in Table 5, pulverization of neat PP without MA or AIBN results in ~3% reduction in $M_w$, confirming that under the conditions utilized in this work, SSSP alone results in negligible MW reduction. For pulverized PP-g-MA samples, we observe $M_w$ reductions of 16 to 25% for 0.3 to 0.5 wt % MA grafting levels from rheology. The 25% reduction in $M_w$ estimated from rheology for PP-g-MA/3 is slightly below the 32% reduction calculated from high-T GPC characterization, indicating approximate agreement between methods. Alternatively, $M_w$ values can be determined using data reported by Fujiyama et al. in an $\eta_o$-$M_w$ correlation for PP. Percent reductions in $M_w$ obtained from this correlation agree well with the determinations in Table 5 made by simple application of the 3.4 power law relation to our $\eta_o$ data (see Table 7).

TABLE 7

$M_w$ Reductions for Samples made by SSSP as Determined from Data Presented by Fujiyama et al.

| Sample | MA grafting level (wt %) | $\eta_o$ (Pa · s) | $M_w$ (g/mol) | Percent $M_w$ reduction (%) |
|---|---|---|---|---|
| Neat PP pellets (as received) | — | 20,400 | 456,000 | — |
| Neat PP (after SSSP) | — | 18,200 | 444,000 | 3 |
| PP-g-MA/1 | 0.27 ± 0.04 | 11,700 | 398,000 | 13 |
| PP-g-MA/2 | 0.32 ± 0.05 | 8,500 | 359,000 | 21 |
| PP-g-MA/3 | 0.47 ± 0.04 | 7,700 | 344,000 | 24 |

Example 8

Reactivity of PP-g-MA with Pyr-MeNH$_2$

Polymers grafted with MA are used commercially in reactive compatibilization in which the MA unit reacts to form a covalent bond with a functional group, e.g., an amine, on the blend partner chain, such as polyamide. Here, we demonstrate the reactivity of PP-g-MA made by SSSP with a model system involving Pyr-MeNH$_2$. This system was selected because trace levels of pyrenyl chromophores covalently attached via a condensation-type linkage to polymer chains are known to be highly fluorescent in dilute solution and allow for confirmation of reactivity.

FIG. 12A shows the fluorescence spectrum of a solution of 0.3 g/L Pyr-MeNH$_2$ in xylene. FIG. 12B show the fluorescence spectrum of a 20 g/L PP-g-MA/3 solution in xylene after reaction with Pyr-MeNH$_2$. The latter spectrum was collected after the reaction product was purified by six dissolution/precipitation cycles to remove any unreacted Pyr-MeNH$_2$. Under these solution conditions, the pyrenyl chromophore emission is associated with monomer fluorescence; within error, excimer fluorescence (with a peak intensity at 480 nm and emission extending above 550 nm) is absent. This suggests that any MA oligomers that may be grafted to the PP-g-MA do not react with more than one Pyr-MeNH$_2$ molecule, because the presence of two or more pyrenyl dyes on the oligomers would likely lead to excimer fluorescence. (Excimer fluorescence results when an excited-state dimer produced from interaction of an excited-state pyrenyl unit with a neighboring pyrenyl unit returns to the ground state via radiation of a photon.) Shifts in pyrenyl emission peak wavelength and structure similar to those in FIG. 12 after functionalization have been observed in other studies and are related to how the moieties attached to the pyrenyl unit modify its photophysical response. In any case, the fluorescence of PP-g-MA/3 after reaction with Pyr-MeNH$_2$ (and purification) proves that PP-g-MA made by SSSP can be used for reactive compatibilization. A control study was done on neat PP using the same reaction and purification protocol as for PP-g-MA/3 and resulted in no fluorescence.

Example 9

Physical and Mechanical Properties

Table 5 shows the percent crystallinity for PP-g-MA samples made by SSSP. Percent crystallinity ($\chi_{crys}$) was determined using Eq. 3:

$$\chi_{crys} = (\Delta H_f / \Delta H°_f) \times 100\% \qquad \text{Eq. 3}$$

where $\Delta H_f$ is the sample enthalpy of fusion and $\Delta H°_f$ is enthalpy of fusion for 100% crystalline PP ($\Delta H°_f = 207.1$ J/g). For PP-g-MA samples synthesized via SSSP, 47-48% crystallinity levels were achieved independent of graft level for the 0.3-0.5 wt % MA graft levels (see Table 5) and unchanged from the crystallinity of the neat PP from which the PP-g-MA samples were synthesized. Additionally, melt temperatures of 165-167° C. (peak values) and 171-174° C. (endpoints) were observed for neat PP (after SSSP) and all PP-g-MA samples. These values are identical, within experimental error, to those for the neat PP (as received) from which the PP-g-MA samples were made. These results indicate that physical properties related to crystallinity of neat PP should be retained after MA functionalization by SSSP. It is interesting to note that in a very recent publication, Zhang et al. described the synthesis of high MW PP-g-MA from copolymers of propylene and p-(3-butenyl) toluene. For MA graft levels of 0.3-0.5 wt % (as determined from FTIR) they observed sample crystallinities of 21-39%, significantly below those for PP-g-MA synthesized by SSSP; such a reduction of PP crystallinity may compromise mechanical and physical properties significantly.

Table 5 also shows Young's modulus (E) and yield strength ($\delta_y$) values of neat PP before and after SSSP and PP-g-MA samples. Within error, SSSP of neat PP had no effect on E and $\sigma_y$ values, consistent with the fact that the MW and crystallinity of neat PP before and after SSSP were identical or nearly so. Relative to neat PP, the three PP-g-MA samples exhibited ~10% decreases in $\sigma_y$; only PP-g-MA/3 with the highest MA grafting level (~0.5 wt %) and largest $M_w$ reduction (~25% by rheology) exhibited any modulus reduction, ~10% in this case. Thus, the tensile properties of PP-g-MA made by SSSP are at most only slightly degraded relative to those of the neat PP from which they were synthesized. This is expected based on the 0.3-0.5 wt % MA incorporation and the limited MW reduction in the PP-g-MA samples.

Example 10

Proposed Mechanism of PP-g-MA Synthesis Via SSSP Using AIBN as Radical Initiator A mechanism for functionalization can be considered as initiated with the decomposition of AIBN into radicals, according to Scheme 1. Azo-type initiators are understood to form radicals that do not participate significantly in chain transfer but are excellent at addition reactions. Thus, it is expected that radicals from AIBN will add onto MA molecules to form MA-complex radicals. An MA-complex radical can then abstract hydrogen from a tertiary carbon on a PP chain to form a PP macroradical. The macroradical can either add an MA unit to form PP-g-MA (Scheme 1, step [4]) or undergo β-scission, resulting in MW reduction. The dominant activity of the macroradical is MA grafting owing to the low temperature. Thus, a benefit of using SSSP is radical chemistries that encourage MA grafting and strongly suppress β-scission. Once MA is grafted onto PP, the radical on the MA molecule can either abstract a tertiary H atom from a PP chain (Scheme 1, step [5]) or add other MA molecules resulting in MA oligomers grafted onto PP; see Scheme 2, step [1]. The radical on the MA oligomer can be stabilized after it abstracts an H atom from a PP chain. Heinen et al. showed that for PP functionalization with MA at 170° C., grafting of MA oligomers onto PP was highly unlikely because radicals that may result in oligomer formation are more likely to abstract a tertiary H atom from PP to form a PP macroradical. However, for PP-g-MA made by SSSP, the FTIR spectra (FIG. 11) strongly suggest that some MA oligomers are grafted onto PP. Thus, by functionalizing PP via SSSP at low temperature, a different type of radical chemistry encourages some MA homopolymerization. It is worth noting that the presence of grafted MA oligomers is not believed to affect the utility of PP-g-MA in commercial applications.

Scheme 3 illustrates another potential reaction between the MA-complex radical (produced in Scheme 1, step [2]) and a PP macroradical to produce PP functionalized with the MA-complex radical. However, there is no indication of the nitrile (—CN) bond stretch in FTIR spectra (at 2260-2240 cm$^{-1}$) of the PP-g-MA samples; this suggests that the reaction occurs to at most a very small extent during MA functionalization of PP by SSSP. It is also important to note that because PP-g-MA synthesis by SSSP is not occurring in an inert environment, it is possible to achieve some degree of radical stabilization by atmospheric oxygen (not shown in schemes).

Scheme 1: Proposed mechanism for MA functionalization using AIBN via SSSP; PP functionalization with a single anhydride molecule.

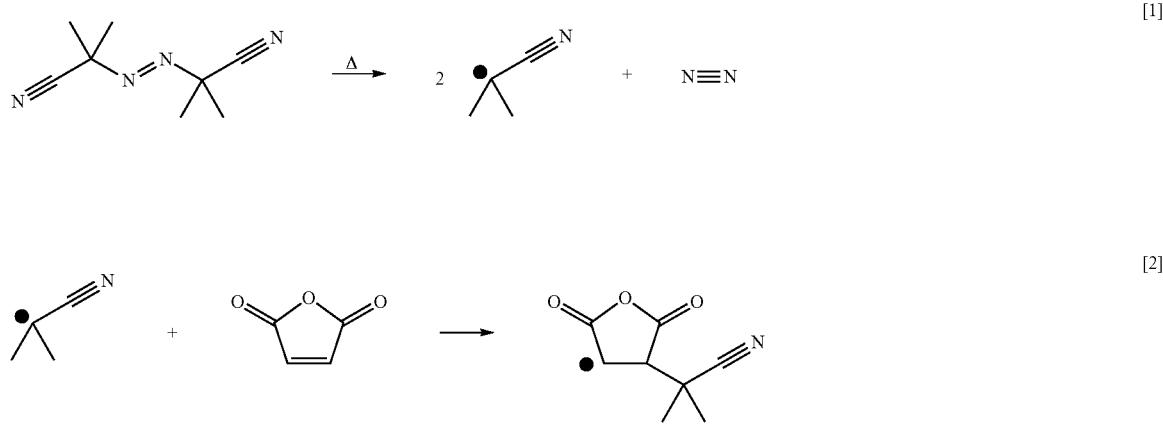

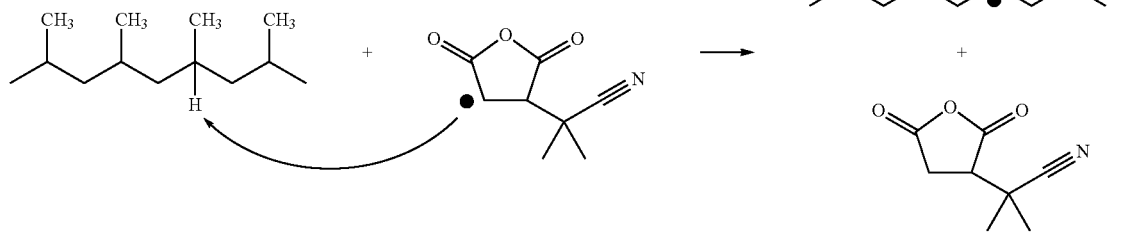
[3]
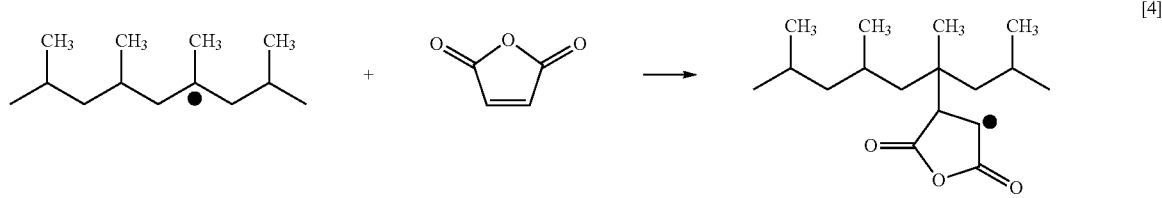
[4]
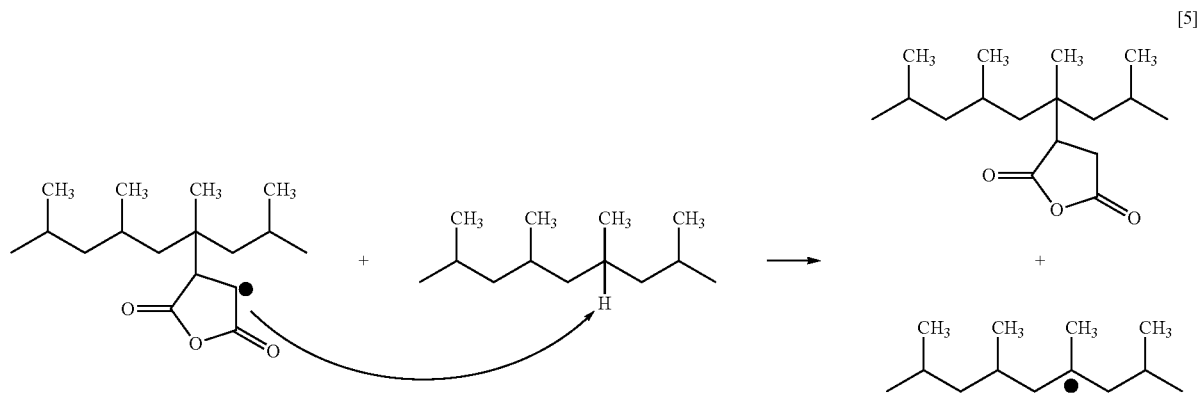
[5]
Scheme 2: Proposed mechanism for MA functionalization using AIBN via SSSP; PP functionalization with MA oligomers.
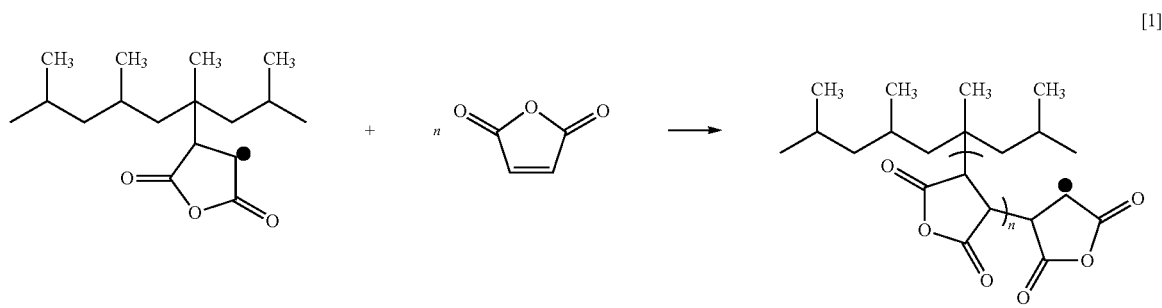
[1]

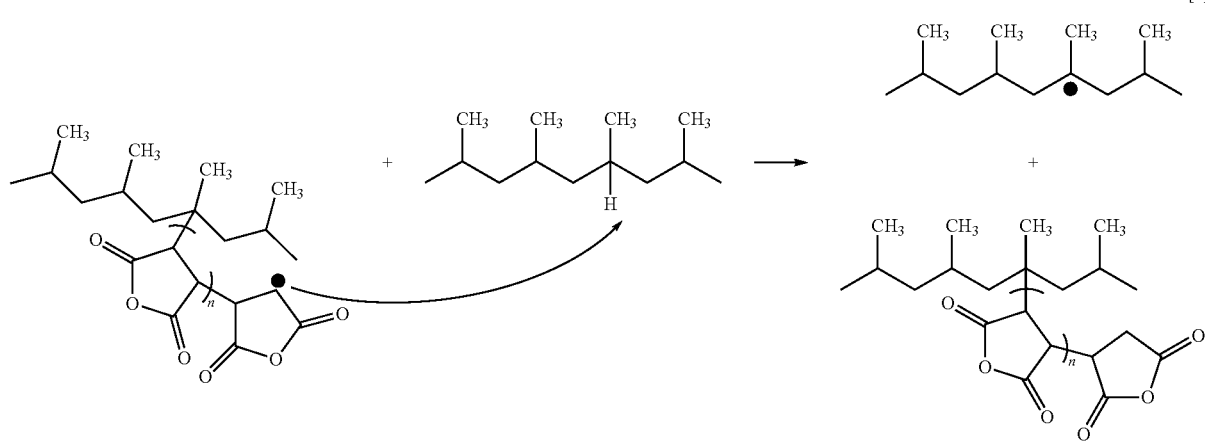

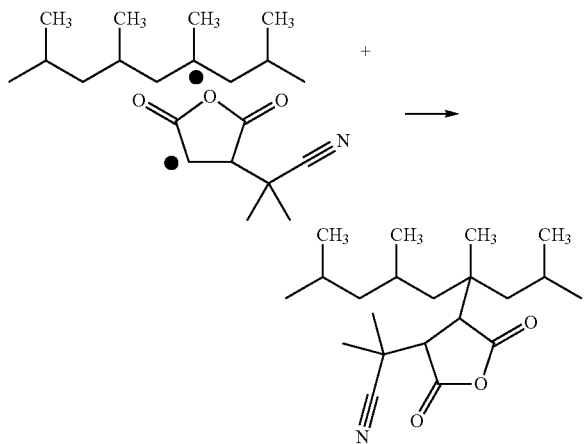

Scheme 3: Proposed mechanism for MA functionalization using AIBN via SSSP; PP functionalization with an MA-complex radical Example 11

Using a pilot-plant/research scale pulverizer, SSSP can produce PP-g-MA at 0.5 wt % MA graft level with a greater than 90% suppression of scission per repeat unit relative to that obtained with reactive melt extrusion. At 0.5 wt % MA, the grafting efficiency for this PP-g-MA sample is ~13%. Optimization of the SSSP-based synthesis of PP-g-MA can be considered for MA graft level, MW reduction, or output rate. The graft levels associated with PP-g-MA synthesis by SSSP can be tuned by varying the specific work that is done on the material during SSSP. In particular, the temperature of the polymer in the pulverizer increases as specific work increases, and an increase in graft level is thus expected with increasing specific work. This was demonstrated with a simple variation on the synthesis of PP-g-MA/3 (using 4 wt % MA and 1.5 wt % AIBN). By increasing the feed rate by 45%, both the specific work done on the polymer and the MA graft level increased, the latter from 0.5 to 0.7 wt % (an increase from ~13 to ~18% in grafting efficiency). This result indicates that graft level and grafting efficiency can be tuned substantially by SSSP processing conditions alone via connection to specific work and temperature. Further, given that MA is relatively inexpensive and comparable in cost to PP, suppression of MW reduction is of particular interest, and the extent of this suppression also appears tunable by SSSP conditions.

SSSP processing of polyolefins has been done at rates exceeding 150 kg/hr with a 60-mm-diameter screw, commercial-scale pulverizer and can be scaled up. Analysis of the economics of SSSP, including amortized cost of the equipment, energy, labor, maintenance, and contingencies (but not including the cost of materials), indicates that SSSP of polyolefins can be done efficiently and economically using commercial-scale equipment.

In summary, as illustrated by several representative, non-limiting embodiments, this invention provides a methodology for post-polymerization synthesis of PP-g-MA which very strongly suppresses β-scission, a radical chemistry that is highly dependent on temperature, and its deleterious side effect of MW reduction. Furthermore, we have provided reaction schemes consistent with the research literature and our experimental results that explain both the MA grafting to PP and the suppression of chain scission achieved by SSSP. At the high temperatures utilized with the common commercial method of PP-g-MA synthesis (i.e., reactive extrusion), the extent of β-scission is significant and results in dramatic MW reduction and degradation of properties. For example, when Shi et al. synthesized PP-g-MA with 0.5 wt % MA graft level by melt extrusion, there was one scission event per 1430 PP repeat units, resulting in a 51% reduction of $M_n$ (from a reported 65,000 to 32,000 g/mol) and a 71% reduction in $M_w$ (from a reported 273,000 to 80,000 g/mol). We have suppressed β-scission by taking advantage of radical chemistries that are present at the relatively low temperatures associated with SSSP. For example, when we synthesize PP-g-MA with 0.5 wt % MA graft level, MW characterization by high-T GPC indicates that there is one scission event per 24,500 repeat units. Thus, SSSP reduces the probability of scission per repeat unit by ~94% relative to that achieved in reactive extrusion at a 0.5 wt % MA graft level. (The level of scission that accompanied SSSP led to an 8% reduction in $M_n$, from 97,000 to 89,000 g/mol, and a 32% reduction in $M_w$, from 397,000 to 268,000 g/mol.) Another unique facet of this study is the use of AIBN rather than an organic peroxide as initiator. Unlike radicals produced from peroxides, radicals produced by AIBN do not participate in chain transfer to PP at low or high temperature, ensuring that MW reduction can be strongly suppressed during subsequent melt processing of PP-g-MA into a final product.

Because of the suppressed MW reduction achieved with SSSP, PP-g-MA exhibits little to no mechanical or physical property degradation relative to the neat PP from which it is made. The resulting PP-g-MA is also effective in model condensation-type reactions and thus will be effective in applications related to reactive compatibilization. These results indicate that post-polymerization functionalization by SSSP can answer the long-standing challenge of grafting functional groups onto polypropylene in a selective and mild manner. Given its continuous, solventless, and industrially scalable nature, SSSP is also a candidate to be used commercially for producing PP-g-MA with strong suppression of chain scission and MW reduction.

We claim:

1. A method of preparing a functionalized polymer, said method comprising:
providing a mixture comprising a polymer comprising a polypropylene component, a functionalization component comprising an α, β-unsaturated carboxy derived-moiety and a free-radical initiator component; and
applying a mechanical energy to said mixture through solid-state shear pulverization in the presence of cooling sufficient to maintain said polymer in a solid state during said pulverization, said pulverization solventless and sufficient to graft a said carboxy-derived moiety onto said polypropylene component, said pulverization providing a functionalized polymer.

2. The method of claim 1 wherein said polymer is a polypropylene.

3. The method of claim 1 wherein said functionalization component is maleic anhydride.

4. The method of claim 1 wherein said polymer is a polypropylene, and said functionalization component is maleic anhydride.

5. The method of claim 4 wherein said free-radical initiator is azobisisobutyronitrile.

6. The method of claim 1 wherein said functionalized polymer is blended with a polymer more polar than said polypropylene component of said polymer.

7. The method of claim 6 wherein said functionalized polymer is blended with a nylon.

8. The method of claim 1 wherein said functionalization component is maleic anhydride, and said carboxy-derived moiety is a maleic anhydride monomer.

9. The method of claim 8 wherein said polymer is a polypropylene.

10. The method of claim 8 wherein said maleic anhydride-functionalized polymer is blended with a polymer more polar than said polypropylene.

11. The method of claim 10 wherein said functionalized polymer is blended with a nylon.

12. The method of claim 8 wherein up to about 0.70 wt. % of said polypropylene is grafted maleic anhydride.

13. A method of using solid-state shear pulverization to prepare a functionalized polymer, said method comprising:
providing a mixture comprising a polymer comprising a polypropylene component, a functionalization component comprising an α,β-unsaturated carboxy derived-moiety and a free-radical initiator component;
introducing said mixture to a solid-state shear pulverization apparatus, said apparatus comprising a cooling component; and
applying a mechanical energy to said mixture through solid-state shear pulverization in the presence of cooling sufficient to maintain said polymer in a solid state during said pulverization, said pulverization solventless and sufficient to graft a said carboxy derived-moiety onto said polypropylene component, said pulverization providing a functionalized polymer.

14. The method of claim 13 wherein said polymer is a polypropylene.

15. The method of claim 14 wherein said functionalization component is maleic anhydride.

16. The method of claim 13 wherein said polymer is a polypropylene, and said functionalization component is maleic anhydride.

17. The method of claim 16 wherein said free-radical initiator is azobisisobutyronitrile.

18. A method of using solid-state shear pulverization to control molecular weight reduction during maleic anhydride functionalization of polypropylene, said method comprising:
providing a mixture comprising a polypropylene component, maleic anhydride and an azobisisobutyronitrile free-radical initiator component;
introducing said mixture into a solid-state shear pulverization apparatus, said apparatus comprising a cooling component; and
applying a mechanical energy to said mixture through solid-state shear pulverization in the presence of cooling sufficient to maintain polypropylene in a solid state during said pulverization, said pulverization solventless and sufficient to graft a pendent monomeric maleic anhydride moiety onto polypropylene, said pulverization suppressing molecular weight reduction of said propylene component, said reduction as compared to the molecular weight reduction of a polypropylene component of a maleic anhydride-functionalized polypropylene prepared by melt-processing.

19. The method of claim 18 wherein said molecular weight reduction of said polypropylene component is suppressed to less than about 30%.

20. The method of claim 18 wherein said functionalized polymer is blended with a polymer more polar than polypropylene.

21. The method of claim 20 wherein said functionalized polymer is blended with a nylon.

22. A method of preparing a functionalized polymer, said method comprising:
providing a mixture comprising a polymer component, a functionalization component, comprising an α,β-unsaturated carboxy-derived moiety and a free-radical initiator; and
applying a mechanical energy to said mixture through solid-state shear pulverization in the presence of cooling sufficient to maintain said polymer in a solid state during said pulverization, said pulverization solventless and sufficient to graft a carboxy-derived moiety onto said polymer component, said pulverization providing a functionalized polymer.

23. The method of claim 22 wherein said polymer component is selected from polyolefins, copolymers of said polyolefins and combinations thereof.

24. The method of claim 23 wherein said polymer component is selected from polyethylene, polypropylene and copolymers thereof.

25. The method of claim 24 wherein said polymer component is a polypropylene, said functionalization component is maleic anhydride and said carboxy-derived moiety is a maleic anhydride monomer.

26. The method of claim 22 wherein said functionalization component comprises about 0.01 wt. % to about 10 wt. % of said mixture.

27. The method of claim 22 wherein said initiator comprises about 0.1 wt % to about 40 wt % of said mixture.

28. The method of claim 27 wherein said initiator is AIBN.

29. The method of claim 22 wherein said mixture comprises a filler component selected from cellulose, rice husk ash, talc, silica, modified clay, unmodified clay, modified graphite, unmodified graphite, graphene, single-walled carbon nanotubes, multi-walled carbon nanotubes and combinations thereof.

30. The method of claim 29 wherein said filler component comprises about 0.1 wt. % to about 50 wt. % of said mixture.

* * * * *